(12) United States Patent
Budvytis et al.

(10) Patent No.: US 12,206,575 B2
(45) Date of Patent: *Jan. 21, 2025

(54) AUTOMATIC NETWORK CONFIGURATION

(71) Applicant: Netflow, UAB, Vilnius (LT)

(72) Inventors: Donatas Budvytis, Vilnius (LT); Karolis Kaciulis, Kaisiadorys (LT)

(73) Assignee: Netflow, UAB, Vilnius (LT)

( * ) Notice: Subject to any disclaimer, the term of this patent is extended or adjusted under 35 U.S.C. 154(b) by 268 days.

This patent is subject to a terminal disclaimer.

(21) Appl. No.: 17/677,236

(22) Filed: Feb. 22, 2022

(65) Prior Publication Data

US 2023/0216783 A1 Jul. 6, 2023

Related U.S. Application Data

(63) Continuation of application No. 17/568,357, filed on Jan. 4, 2022.

(51) Int. Cl.
*H04L 45/302* (2022.01)
*H04L 41/08* (2022.01)
*H04L 45/02* (2022.01)
*H04L 47/80* (2022.01)

(52) U.S. Cl.
CPC ........ *H04L 45/302* (2013.01); *H04L 41/0886* (2013.01); *H04L 45/02* (2013.01); *H04L 47/805* (2013.01)

(58) Field of Classification Search
CPC ... H04L 45/302; H04L 41/0886; H04L 45/02; H04L 47/805; H04L 43/55
See application file for complete search history.

(56) References Cited

U.S. PATENT DOCUMENTS

| | | | |
|---|---|---|---|
| 8,776,209 B1* | 7/2014 | Kumar | H04L 63/0815 709/225 |
| 8,782,755 B2 | 7/2014 | Harris et al. | |
| 10,237,187 B2 | 3/2019 | Paramasivam | |
| 11,089,111 B2 | 8/2021 | Markuze et al. | |
| 2019/0312772 A1 | 10/2019 | Zhao et al. | |
| 2020/0213360 A1* | 7/2020 | Ojha | H04W 88/04 |
| 2021/0234834 A1* | 7/2021 | Koshy | H04L 69/14 |

* cited by examiner

*Primary Examiner* — Derrick W Ferris
*Assistant Examiner* — M Mostazir Rahman
(74) *Attorney, Agent, or Firm* — Young Basile Hanlon & MacFarlane, P.C.

(57) ABSTRACT

Automatic network configuration includes obtaining, by a virtual private network service provider infrastructure system, ranking data for data transport pathways between the virtual private network service provider infrastructure system and an external system, wherein a respective data transport pathway from the data transport pathways includes a respective exit node in the virtual private network service provider infrastructure system in communication with a respective entry node in the external system, wherein obtaining the ranking data includes obtaining at least a portion of the ranking data by testing a service provided by the external system via the entry node, and allocating, by the virtual private network service provider infrastructure system, a data transport pathway from the data transport pathways to a communication session, wherein the data transport pathway is a highest-ranking data transport pathway in the ranking data.

20 Claims, 5 Drawing Sheets

AUTOMATIC NETWORK CONFIGURATION

CROSS-REFERENCE TO RELATED APPLICATION(S)

This application claims priority to and the benefit of U.S. Application patent Ser. No. 17/568,357, filed Jan. 4, 2022, the entire disclosure of which is hereby incorporated by reference.

BACKGROUND

Computing systems, and system features thereof, are subject to malicious and excessive use that reduce the availability, throughput, reliability, and responsiveness of the system by improperly utilizing system resources. As such techniques to automatically configure network resources would be advantageous.

SUMMARY

Disclosed herein are implementations of automatic network configuration.

An aspect of the disclosure is a method for automatic network configuration. Automatic network configuration includes obtaining, by a service provider infrastructure system, ranking data for data transport pathways between the service provider infrastructure system and an external system, wherein a respective data transport pathway from the data transport pathways includes a respective exit node in the service provider infrastructure system in communication with a respective entry node in the external system, wherein obtaining the ranking data includes obtaining at least a portion of the ranking data by testing a service provided by the external system via the entry node, and allocating, by the service provider infrastructure system, a data transport pathway from the data transport pathways to a communication session, wherein the data transport pathway is a highest-ranking data transport pathway in the ranking data.

In the aspects described herein, obtaining the ranking data may include identifying a subset of the data transport pathways as a priority pool in accordance with the ranking data. In the aspects described herein, obtaining the ranking data may include allocating the data transport pathway and may include allocating the priority pool to the communication session. In the aspects described herein, obtaining the ranking data may include identifying one or more available candidate exit nodes in the service provider infrastructure system, wherein the available candidate exit nodes include the respective exit node. In the aspects described herein, obtaining the ranking data may include identifying attribute data for the respective exit node. In the aspects described herein, obtaining the ranking data may include generating test results data for the respective exit node. In the aspects described herein, generating the test results data for the respective exit node may include sending, to the external system, via the respective exit node in the service provider infrastructure system and the respective entry node in the external system, a request to access a resource of the external system. In the aspects described herein, generating the test results data for the respective exit node may include obtaining data indicating whether the resource is available via the respective exit node in the service provider infrastructure system and the respective entry node in the external system. In the aspects described herein, the service provider infrastructure system may be a virtual private network service provider infrastructure system. In the aspects described herein, the communication session may include a client system communicating with the external system. In the aspects described herein, the service provider infrastructure system may receive a protocol data unit associated with the communication session from the client system via a virtual private network tunnel.

Another aspect of the disclosure is an apparatus of a service provider infrastructure system. The apparatus includes a non-transitory computer-readable storage medium, and a that executes instructions stored in the non-transitory computer-readable storage medium to perform automatic network configuration. To perform automatic network configuration the processor executes the instructions stored in the non-transitory computer-readable storage medium to obtain ranking data for data transport pathways between the service provider infrastructure system and an external system, wherein a respective data transport pathway from the data transport pathways includes a respective exit node in the service provider infrastructure system in communication with a respective entry node in the external system, and wherein to obtain the ranking data the processor executes the instructions to obtain at least a portion of the ranking data by testing a service provided by the external system via the entry node. To perform automatic network configuration the processor executes the instructions stored in the non-transitory computer-readable storage medium to allocate a data transport pathway from the data transport pathways to a communication session, wherein the data transport pathway is a highest-ranking data transport pathway in the ranking data.

In the aspects described herein, to obtain the ranking data, the processor may execute the instructions to identify a subset of the data transport pathways as a priority pool in accordance with the ranking data. In the aspects described herein, to allocate the data transport pathway the processor may execute the instructions to allocate the priority pool to the communication session. In the aspects described herein, to obtain the ranking data the processor may execute the instructions to identify one or more available candidate exit nodes in the service provider infrastructure system, wherein the available candidate exit nodes include the respective exit node. In the aspects described herein, to obtain the ranking data the processor may execute the instructions to identify attribute data for the respective exit node. In the aspects described herein, to obtain the ranking data the processor may execute the instructions to generate test results data for the respective exit node. In the aspects described herein, to generate the test results data for the respective exit node the processor may execute the instructions to send, to the external system, via the respective exit node in the service provider infrastructure system and the respective entry node in the external system, a request to access a resource of the external system. In the aspects described herein, to generate the test results data for the respective exit node the processor may execute the instructions to obtain data indicating whether the resource is available via the respective exit node in the service provider infrastructure system and the respective entry node in the external system.

Another aspect of the disclosure is a non-transitory computer-readable storage medium, comprising executable instructions that, when executed by a processor, perform automatic network configuration. Automatic network configuration includes obtaining, by a service provider infrastructure system, ranking data for data transport pathways between the service provider infrastructure system and an external system, wherein a respective data transport pathway from the data transport pathways includes a respective exit node in the service provider infrastructure system in communication with a respective entry node in the external system, wherein obtaining the ranking data includes obtaining at least a portion of the ranking data by testing a service provided by the external system via the entry node, and allocating, by the service provider infrastructure system, a data transport pathway from the data transport pathways to a communication session, wherein the data transport pathway is a highest-ranking data transport pathway in the ranking data.

In the aspects described herein, obtaining the ranking data may include identifying a subset of the data transport pathways as a priority pool in accordance with the ranking data. In the aspects described herein, obtaining the ranking data may include allocating the data transport pathway and may include allocating the priority pool to the communication session. In the aspects described herein, obtaining the ranking data may include identifying one or more available candidate exit nodes in the service provider infrastructure system, wherein the available candidate exit nodes include the respective exit node. In the aspects described herein, obtaining the ranking data may include identifying attribute data for the respective exit node. In the aspects described herein, obtaining the ranking data may include generating test results data for the respective exit node. In the aspects described herein, generating the test results data for the respective exit node may include sending, to the external system, via the respective exit node in the service provider infrastructure system and the respective entry node in the external system, a request to access a resource of the external system. In the aspects described herein, generating the test results data for the respective exit node may include obtaining data indicating whether the resource is available via the respective exit node in the service provider infrastructure system and the respective entry node in the external system. In the aspects described herein, the service provider infrastructure system may be a virtual private network service provider infrastructure system. In the aspects described herein, the communication session may include a client system communicating with the external system. In the aspects described herein, the service provider infrastructure system may receive a protocol data unit associated with the communication session from the client system via a virtual private network tunnel.

These and other objects, features, and characteristics of the apparatus, system, and/or method disclosed herein, as well as the methods of operation and functions of the related elements of structure and the combination of parts and economics of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Computing communications networks, the systems and devices that use computing communications networks, and applications, services, or microservices implemented by the systems and devices that use computing communications networks may include, or implement, system features, which may include logical system features, such as applications, or application programming interfaces (APIs), services, microservices, logical servers, such as web servers, or hardware resources, such as processing resources, memory resources, communications bandwidth resources, or any other discernable logical or physical features, or combinations thereof. Communications transported using computing communications networks may be transported via various data transport pathways. Service provider infrastructure systems, such as internet service providers and virtual private network providers, may identify and configure optimal data transport pathways for transporting communications, which may be optimized for speed, reliability, or both. For example, a data transport pathway may be used to transport data sent by a client device to a target destination, which may include sending the data to the target destination, which may be an external system or an entry node thereof, via an exit node of the service provider infrastructure system.

In the service provider infrastructure systems described herein, to improve the performance and reliability of the service provider infrastructure systems, the optimal data transport pathway, or the optimal exit node, may be identified based on attributes of the exit node, test results indicating the accessibility of the external system, or content hosted or a service provided thereby, via the exit node. Exit nodes, and corresponding data transport pathways, may be ranked based on the attributes and test results data, and may be allocated to respective communication sessions based on the ranking to maximize the performance and reliability thereof. In some implementations, the exit nodes, or the corresponding data transport pathways, may be pooled based on the attributes and test results data, and the exit nodes may be allocated based on the pooling.

In the service provider infrastructure systems described herein, test results, such as synthetic test results, may be generated or obtained by sending, by the service provider infrastructure system, such as via respective exit nodes, to the external system, or the external server, such as via the respective entry node in the external system, respective requests to access one or more resources, such as a service or content hosted thereon, of the external system, and obtaining, such as generating, measuring, or calculating, data indicating whether the respective resource is available via the respective exit node in the service provider infrastructure system and the respective entry node in the external system.

Figure 1:
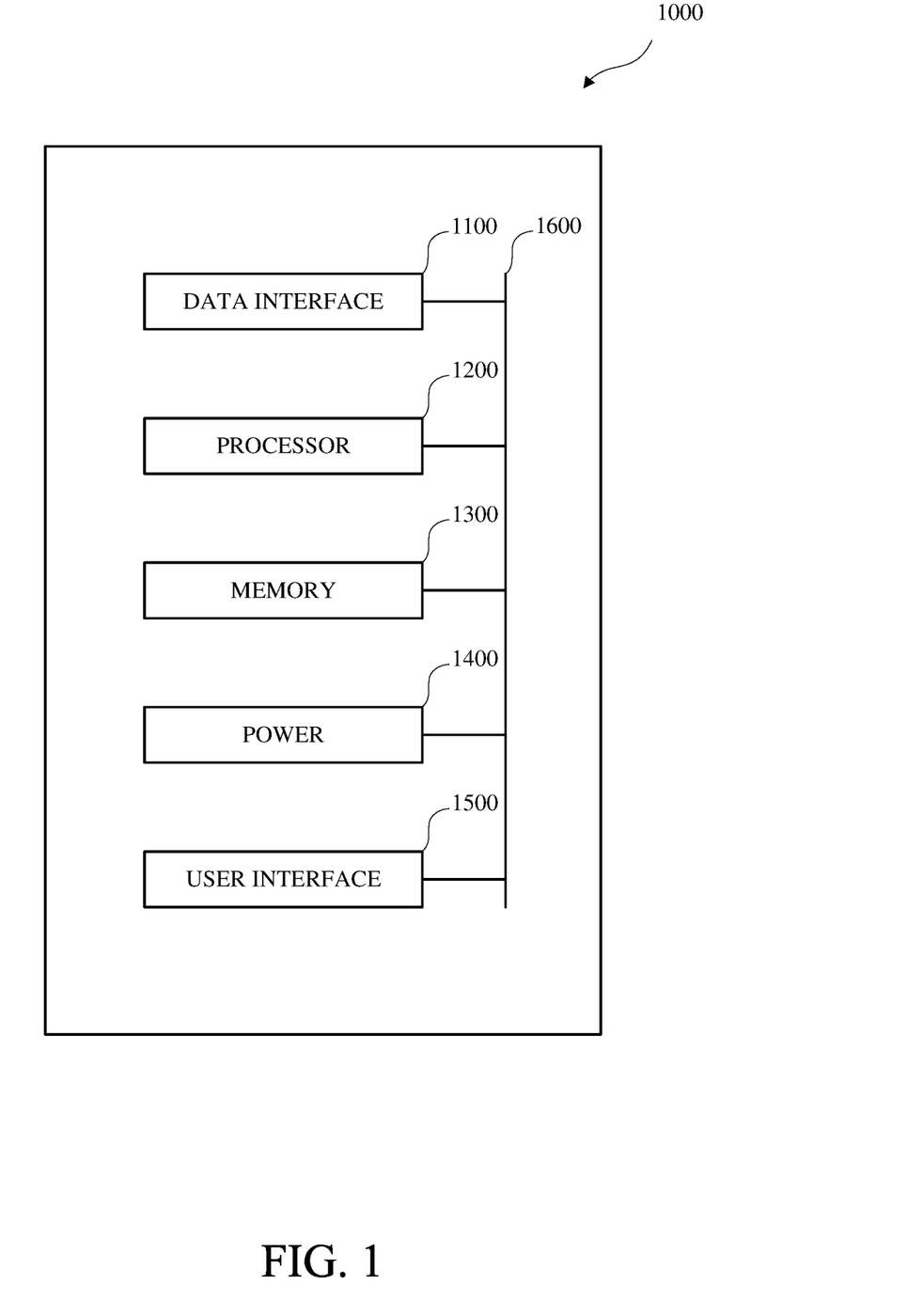
FIG. 1 is a block diagram of an example of a computing device.

FIG. 1 is a block diagram of an example of a computing device 1000. The computing device 1000 may implement, execute, or perform, one or more aspects of the methods and techniques described herein. The computing device 1000 includes a data interface 1100, a processor 1200, memory 1300, a power component 1400, a user interface 1500, and a bus 1600 (collectively, components of the computing device 1000). Although shown as a distinct unit, one or more of the components of the computing device 1000 may be integrated into respective distinct physical units. For example, the processor 1200 may be integrated in a first physical unit and the user interface 1500 may be integrated in a second physical unit. The computing device 1000 may include aspects or components not expressly shown in FIG. 1, such as an enclosure or one or more sensors.

In some implementations, the computing device 1000 is a stationary device, such as a personal computer (PC), a server, a workstation, a minicomputer, or a mainframe computer. In some implementations, the computing device 1000 is a mobile device, such as a mobile telephone, a personal digital assistant (PDA), a laptop, or a tablet computer.

The data interface 1100 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 1100 may include, or may be, a transceiver. Although not shown separately in FIG. 1, the data interface 1100 may include, or may be operatively coupled with, an antenna for wireless electronic communication. Although not shown separately in FIG. 1, the data interface 1100 may include, or may be operatively coupled with, a wired electronic communication port, such as an Ethernet port, a serial port, or another wired port, that may interface with, or may be operatively coupled to, a wired electronic communication medium. In some implementations, the data interface 1100 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 1000, or one or more of the components thereof, and one or more external electronic or computing devices. Although shown as one unit in FIG. 1. the data interface 1100 may include multiple physical components, such as a wired data interface and a wireless data interface.

For example, the computing device 1000 may electronically communicate, such as transmit, receive, or exchange computer accessible data, with one or more other computing devices via one or more wired or wireless communication links, or connections, such as via a network, using the data interface 1100, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 1200 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 1200 is implemented as a central processing unit (CPU), such as a microprocessor. In some implementations, the processor 1200 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 1200 includes one or more processing units. A processing unit may include one or more processing cores. The computing device 1000 may include multiple physical or virtual processing units (collectively, the processor 1200), which may be interconnected, such as via wired, or hardwired, connections, via wireless connections, or via a combination of wired and wireless connections. In some implementations, the processor 1200 is implemented in a distributed configuration including multiple physical devices or units that may be coupled directly or across a network. The processor 1200 includes internal memory (not expressly shown), such as a cache, a buffer, a register, or a combination thereof, for internal storage of data, such as operative data, instructions, or both. For example, the processor 1200 may read data from the memory 1300 into the internal memory (not shown) for processing.

The memory 1300 is a non-transitory computer-usable or computer-readable medium, implemented as a tangible device or component of a device. The memory 1300 contains, stores, communicates, transports, or a combination thereof, data, such as operative data, instructions, or both. For example, the memory 1300 stores an operating system of the computing device 1000, or a portion thereof. The memory 1300 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 1300 may include non-volatile memory, such as a disk drive, or another form of non-volatile memory capable of persistent electronic data storage, such as in the absence of an active power supply. The memory 1300 may include, or may be implemented as, one or more physical or logical units.

The memory 1300 stores executable instructions or data, such as application data, an operating system, or a combination thereof, for access, such as read access, write access, or both, by the other components of the computing device 1000, such as by the processor 1200. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 1300 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 1400 obtains, stores, or both, power, or energy, used by the components of the computing device 1000 to operate. The power component 1400 may be implemented as a general-purpose alternating-current (AC) electric power supply, or as a power supply interface, such as an interface to a household power source or other external power distribution system. In some implementations, the power component 1400 may be implemented as a single use battery or a rechargeable battery such that the computing device 1000 operates, or partially operates, independently of an external power distribution system. For example, the power component 1400 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 1000.

The user interface 1500 includes one or more units or devices for interfacing with an operator of the computing device 1000, such as a human user. In some implementations, the user interface 1500 obtains, receives, captures, detects, or otherwise accesses, data representing user input to the computing device, such as via physical interaction with the computing device 1000. In some implementations, the user interface 1500 outputs, presents, displays, or otherwise makes available, information, such as to an operator of the computing device 1000, such as a human user.

The user interface 1500 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a physical user interface 1500 may be omitted, or absent, from the computing device 1000.

The bus 1600 distributes or transports data, power, or both among the components of the computing device 1000 such that the components of the computing device are operatively connected. Although the bus 1600 is shown as one component in FIG. 1, the computing device 1000 may include multiple busses, which may be connected, such as via bridges, controllers, or adapters. For example, the bus 1600 may be implemented as, or may include, a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 1000.

Although not shown separately in FIG. 1, data interface 1100, the power component 1400, or the user interface 1500 may include internal memory, such as an internal buffer or register.

Although an example of a configuration of the computing device 1000 is shown in FIG. 1, other configurations may be used. One or more of the components of the computing device 1000 shown in FIG. 1 may be omitted, or absent, from the computing device 1000 or may be combined or integrated. For example, the memory 1300, or a portion thereof, and the processor 1200 may be combined, such as by using a system on a chip design.

Figure 2:
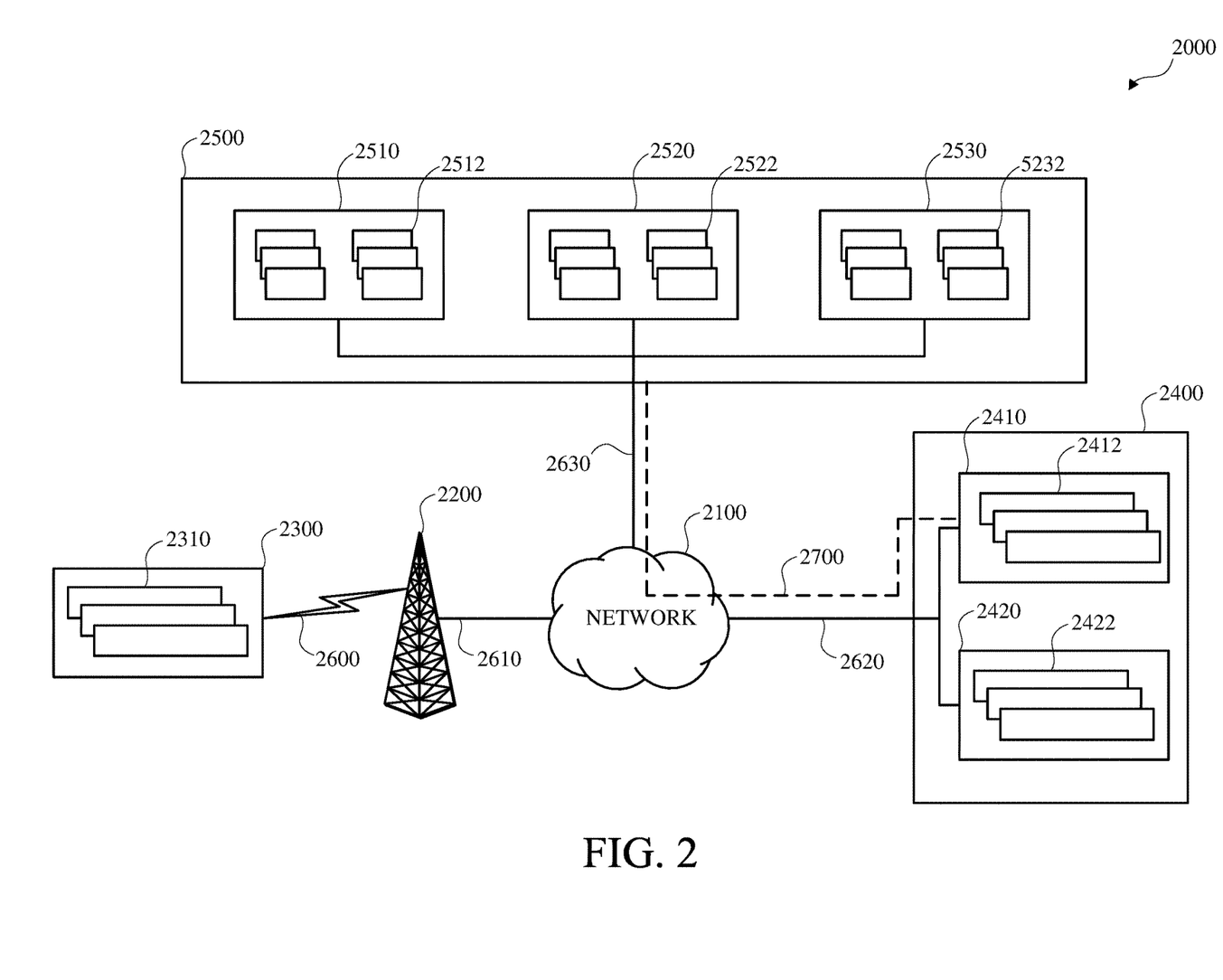
FIG. 2 is a block diagram of an example of a computing and communications system.

FIG. 2 is a diagram of a computing and communications system 2000. The computing and communications system 2000 includes a first network 2100, an access point 2200, a first computing and communications device 2300, a second network 2400, and a third network 2500. The second network 2400 includes a second computing and communications device 2410 and a third computing and communications device 2420. The third network 2500 includes a fourth computing and communications device 2510, a fifth computing and communications device 2520, and a sixth computing and communications device 2530. Other configurations, including fewer or more computing and communications devices, fewer or more networks, and fewer or more access points, may be used.

One or more of the networks 2100, 2400, 2500 may be, or may include, a local area network (LAN), wide area network (WAN), virtual private network (VPN), a mobile or cellular telephone network, the Internet, or any other means of electronic communication. The networks 2100, 2400, 2500 respectively transmit, receive, convey, carry, or exchange wired or wireless electronic communications using one or more communications protocols, or combinations of communications protocols, the transmission control protocol (TCP), the user datagram protocol (UDP), the internet protocol (IP), the real-time transport protocol (RTP), the HyperText Transport Protocol (HTTP), or a combination thereof. For example, a respective network 2100, 2400, 2500, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 2200 may be implemented as, or may include, a base station, a base transceiver station (BTS), a Node-B, an enhanced Node-B (cNode-B), a Home Node-B (HNode-B), a wireless router, a wired router, a hub, a relay, a switch, a bridge, or any similar wired or wireless device. Although the access point 2200 is shown as a single unit, an access point can include any number of interconnected elements. Although one access point 2200 is shown, fewer or more access points may be used. The access point 2200 may communicate with other communicating devices via wired or wireless electronic communications links or via a sequence of such links.

As shown, the access point 2200 communicates via a first communications link 2600 with the first computing and communications device 2300. Although the first communications link 2600 is shown as wireless, the first communications link 2600 may be implemented as, or may include, one or more wired or wireless electronic communications links or a sequence of such links, which may include parallel communications links for multipath communications.

As shown, the access point 2200 communicates via a second communications link 2610 with the first network 2100. Although the second communications link 2610 is shown as wired, the second communications link 2610 may be implemented as, or may include, one or more wired or wireless electronic communications links or a sequence of such links, which may include parallel communications links for multipath communications.

As shown, the first network 2100 communicates with the second network 2400 via a third communications link 2620.

Although the third communications link 2620 is shown as wired, the third communications link 2620 may be implemented as, or may include, one or more wired or wireless electronic communications links or a sequence of such links, which may include parallel communications links for multipath communications.

As shown, the first network 2100 communicates with the third network 2500 via a fourth communications link 2630. Although the fourth communications link 2630 is shown as wired, the fourth communications link 2630 may be implemented as, or may include, one or more wired or wireless electronic communications links or a sequence of such links, which may include parallel communications links for multipath communications.

The computing and communications devices 2300, 2410, 2420, 2510, 2520, 2530 are, respectively, computing devices, such as the computing device 1000 shown in FIG. 1. For example, the first computing and communications device 2300 may be a user device, such as a mobile computing device or a smartphone, the second computing and communications device 2410 may be a user device, such as a laptop, the third computing and communications device 2420 may be a user device, such as a desktop, the fourth computing and communications device 2510 may be a server, such as a database server, the fifth computing and communications device 2530 may be a server, such as a cluster or a mainframe, and the sixth computing and communications device 2530 may be a server, such as a web server.

The computing and communications devices 2300, 2410, 2420, 2510, 2520, 2530 communicate, or exchange data, such as voice communications, audio communications, data communications, video communications, messaging communications, broadcast communications, or a combination thereof, with one or more of the other computing and communications devices 2300, 2410, 2420, 2510, 2520, 2530 respectively using one or more of the networks 2100, 2400, 2500, which may include communicating using the access point 2200, via one or more of the communication links 2600, 2610, 2620, 2630.

For example, the first computing and communications device 2300 may communicate with the second computing and communications device 2410, the third computing and communications device 2420, or both, via the first communications link 2600, the access point 2200, the second communications link 2610, the network 2100, the third communications link 2620, and the second network 2400. The first computing and communications device 2300 may communicate with one or more of the third computing and communications device 2510, the fourth computing and communications device 2520, the fifth computing and communications device 2530, via the first communications link 2600, the access point 2200, the second communications link 2610, the network 2100, the fourth communications link 2630, and the third network 2500.

For simplicity and clarity, the sequence of communications links, access points, networks, and other communications devices between a sending communicating device and a receiving communicating device may be referred to herein as a communications path. For example, the first computing and communications device 2300 may send data to the second computing and communications device 2410 via a first communications path, or via a combination of communications paths including the first communications path, and the second computing and communications device 2410 may send data to the first computing and communications device 2300 via the first communications path, via a second communications path, or via a combination of communications paths, which may include the first communications path.

The first computing and communications device 2300 includes, such as executes, performs, or operates, one or more applications, or services, 2310. The second computing and communications device 2410 includes, such as executes, performs, or operates, one or more applications, or services, 2412. The third computing and communications device 2420 includes, such as executes, performs, or operates, one or more applications, or services, 2422. The fourth computing and communications device 2510 includes, such as stores, hosts, executes, performs, or operates, one or more documents, applications, or services, 2512. The fifth computing and communications device 2520 includes, such as stores, hosts, executes, performs, or operates, one or more documents, applications, or services, 2522. The sixth computing and communications device 2530 includes, such as stores, hosts, executes, performs, or operates, one or more documents, applications, or services, 2532.

In some implementations, one or more of the computing and communications devices 2300, 2410, 2420, 2510, 2520, 2530 may communicate with one or more other computing and communications devices 2300, 2410, 2420, 2510, 2520, 2530, or with one or more of the networks 2400, 2500, via a virtual private network. For example, the second computing and communications device 2410 is shown as communicating with the third network 2500, and therefore with one or more of the computing and communications devices 2510, 2520, 2530 in the third network 2500, via a virtual private network 2700, which is shown using a broken line to indicate that the virtual private network 2700 uses the first network 2100, the third communications link 1620, and the third communications link 1630.

In some implementations, two or more of the computing and communications devices 2300, 2410, 2420, 2510, 2520, 2530 may be in a distributed, or clustered, configuration. For example, the third computing and communications device 2510, the fourth computing and communications device 2520, and the fifth computing and communications device 2530 may, respectively, be elements, or nodes, in a distributed configuration.

In some implementations, one or more of the computing and communications devices 2300, 2410, 2420, 2510, 2520, 2530 may be a virtual device. For example, the third computing and communications device 2510, the fourth computing and communications device 2520, and the fifth computing and communications device 2530 may, respectively, be virtual devices operating on shared physical resources.

Figure 3:
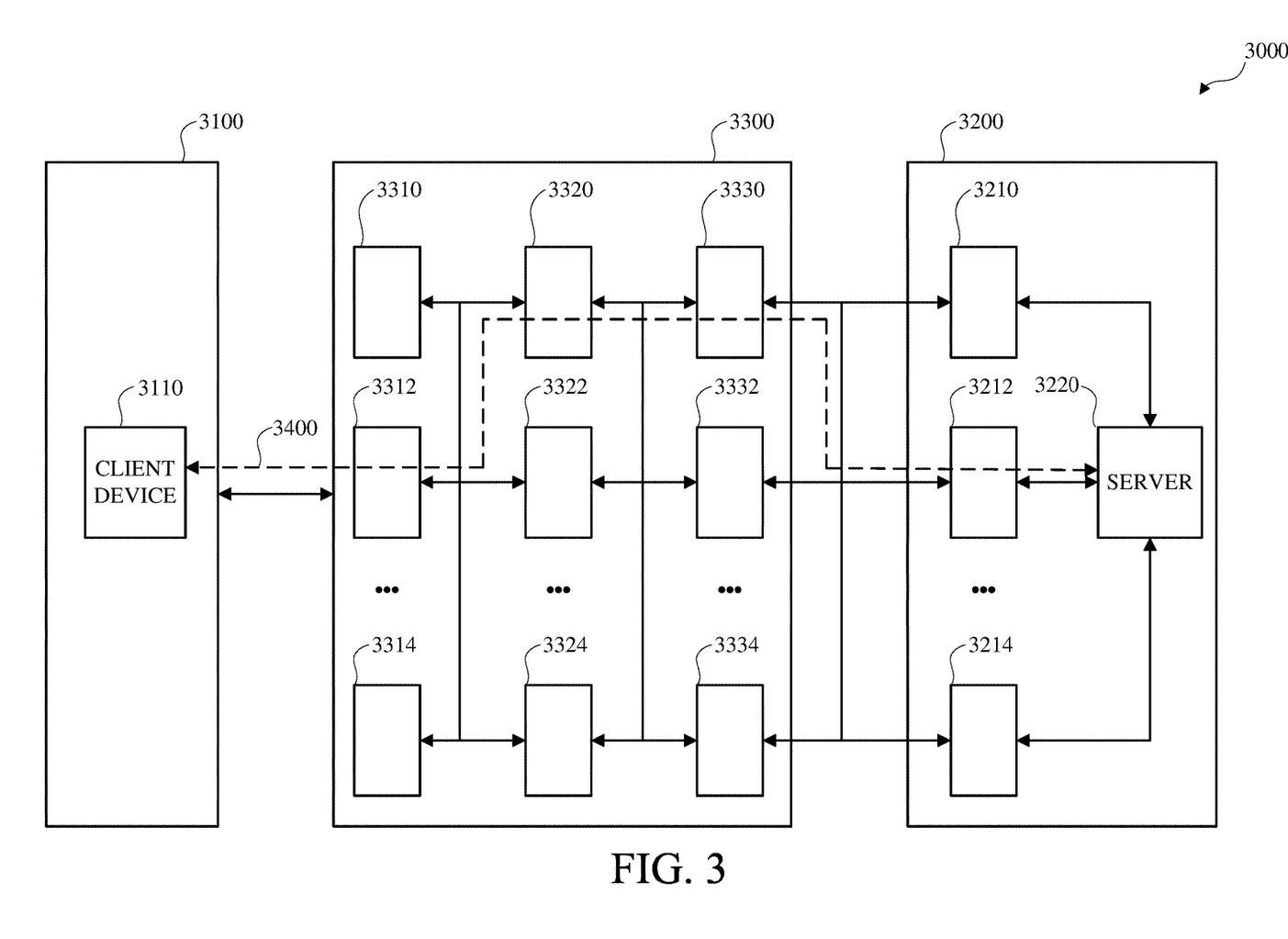
FIG. 3 is a diagram of an example of electronic communication using a service provider infrastructure system.

FIG. 3 is a diagram of an example of electronic communication using a service provider infrastructure system 3000. Electronic communication using a service provider infrastructure system 3000 includes a client system 3100 communicating with a server system 3200 via a service provider infrastructure system 3300. In some implementations, the service provider infrastructure system 3300 may be an internet service provider (ISP) system or network.

The client system 3100 includes a client device 3110, such as the computing device 1000 shown in FIG. 1 or one or more of the computing and communications device 2300, 2410, 2420, 2510, 2520, 2530 shown in FIG. 2. Although one client device 3110 is shown in FIG. 3, the client system 3100 may include multiple computing devices.

The server system 3200, or external system, includes a first server system entry node 3210, a second server system entry node 3212, a third server system entry node 3214, and a server device 3220. Although three server system entry nodes 3210, 3212, 3214 are shown, the server system 3200 may include two or more server system entry nodes as indicated by the ellipsis between the second server system entry node 3212 and the third server system entry node 3214. Although one server device 3220 is shown, the server system 3200 may include multiple server devices. The server system entry nodes 3210, 3212, 3214 and the server system 3200 may be respective computing devices, such as the computing device 1000 shown in FIG. 1 or one or more of the computing and communications device 2300, 2410, 2420, 2510, 2520, 2530 shown in FIG. 2. Although shown separately, in some implementations, the server system entry nodes 3210, 3212, 3214 may be respective server devices. The server system entry nodes 3210, 3212, 3214 may, respectively, communicate with the server device 3220, as indicated by the solid bidirectional lines between the server system entry nodes 3210, 3212, 3214 and the server device 3220.

The service provider infrastructure system 3300 includes a first service provider entry node 3310, a second service provider entry node 3312, a third service provider entry node 3314, a first internal node 3320, a second internal node 3322, a third internal node 3324, a first exit node 3330, a second exit node 3332, and a third exit node 3334.

The service provider entry nodes 3310, 3312, 3314 may be respective computing devices, such as the computing device 1000 shown in FIG. 1 or one or more of the computing and communications device 2300, 2410, 2420, 2510, 2520, 2530 shown in FIG. 2. Although three service provider entry nodes 3310, 3312, 3314 are shown, the service provider infrastructure system 3300 may include one or more service provider entry nodes as indicated by the ellipsis between the second service provider entry node 3312 and the third service provider entry node 3314.

The internal nodes 3320, 3322, 3324 may be respective computing devices, such as the computing device 1000 shown in FIG. 1 or one or more of the computing and communications device 2300, 2410, 2420, 2510, 2520, 2530 shown in FIG. 2. Although three internal nodes 3320, 3322, 3324 are shown, the service provider infrastructure system 3300 may include zero or more internal nodes as indicated by the ellipsis between the second internal node 3322 and the third internal node 3324.

The exit nodes 3330, 3332, 3334 may be respective computing devices, such as the computing device 1000 shown in FIG. 1 or one or more of the computing and communications device 2300, 2410, 2420, 2510, 2520, 2530 shown in FIG. 2. Although three exit nodes 3330, 3332, 3334 are shown, the service provider infrastructure system 3300 may include one or more exit nodes as indicated by the ellipsis between the second exit node 3332 and the third exit node 3334.

Although shown separately, one or more of a respective service provider entry node 3310, 3312, 3314, a respective internal node 3320, 3322, 3324, and a respective exit node 3330, 3332, 3334 may be implemented by a combined physical device.

The service provider entry nodes 3310, 3312, 3314 may, respectively, communicate with the internal nodes 3320, 3322, 3324, as indicated by the solid bidirectional lines between the service provider entry nodes 3310, 3312, 3314 and the internal nodes 3320, 3322, 3324. The internal nodes 3320, 3322, 3324 may, respectively, communicate with the exit nodes 3330, 3332, 3334, as indicated by the solid bidirectional lines between the internal nodes 3320, 3322, 3324 and the exit nodes 3330, 3332, 3334. In some implementations, one or more of the service provider entry nodes 3310, 3312, 3314 may, respectively, communicate with one or more of the exit nodes 3330, 3332, 3334 (not expressly shown).

Multiple data transport pathways between the client device 3110 and the server device 3220 may be identified and used. A respective data transport pathway between the client device 3110 and the server device 3220 includes a data transport pathway between the client device 3110 and the service provider infrastructure system 3300, such as a data transport pathway between the client device 3110 and the first service provider entry node 3310, a data transport pathway between the client device 3110 and the second service provider entry node 3312, or a data transport pathway between the client device 3110 and the third service provider entry node 3314.

A respective data transport pathway between the client device 3110 and the server device 3220 includes a data transport pathway between the service provider infrastructure system 3300 and the server system 3200, which includes an exit node 3330, 3332, 3334 of the service provider infrastructure system 3300 and a server system entry node 3210, 3212, 3214 of the server system 3200, such as a data transport pathway between the service provider infrastructure system 3300 and the server system 3200 that includes the first exit node 3330 and the first server system entry node 3210, a data transport pathway between the service provider infrastructure system 3300 and the server system 3200 that includes the first exit node 3330 and the second server system entry node 3212, a data transport pathway between the service provider infrastructure system 3300 and the server system 3200 that includes the first exit node 3330 and the third server system entry node 3214, a data transport pathway between the service provider infrastructure system 3300 and the server system 3200 that includes the second exit node 3332 and the first server system entry node 3210, a data transport pathway between the service provider infrastructure system 3300 and the server system 3200 that includes the second exit node 3332 and the second server system entry node 3212, a data transport pathway between the service provider infrastructure system 3300 and the server system 3200 that includes the second exit node 3332 and the third server system entry node 3214, a data transport pathway between the service provider infrastructure system 3300 and the server system 3200 that includes the third exit node 3334 and the first server system entry node 3210, a data transport pathway between the service provider infrastructure system 3300 and the server system 3200 that includes the third exit node 3334 and the second server system entry node 3212, or a data transport pathway between the service provider infrastructure system 3300 and the server system 3200 that includes the third exit node 3334 and the third server system entry node 3214.

For example, a data transport pathway 3400 between the client device 3110 and the server device 3220 is shown using a broken directional line for clarity. Other data transport pathways may be used. The data transport pathway 3400 between the client device 3110 and the server device 3220 includes a data transport pathway between the client device 3110 and the service provider infrastructure system 3300, such as between the client device 3110 and the second service provider entry node 3312. The data transport pathway 3400 between the client device 3110 and the server device 3220 includes the data transport pathway between the service provider infrastructure system 3300 and the server system 3200 that includes the first exit node 3330 and the second server system entry node 3212.

Figure 5:
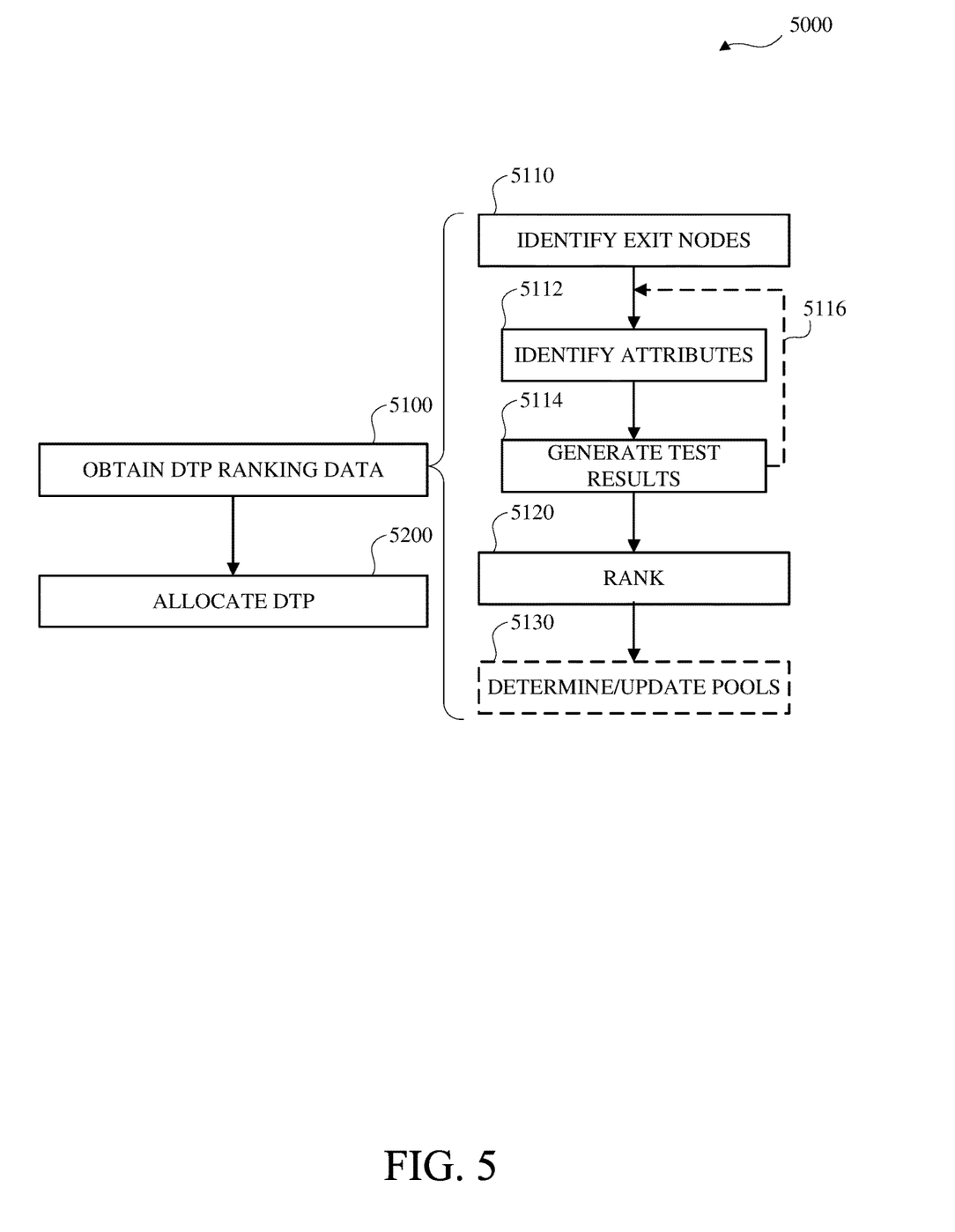
FIG. 5 is a flowchart of an example of automatic network configuration.

To identify, and use, a data transport pathway, such as the data transport pathway 3400, the service provider infrastructure system 3300, or a component, or components, thereof, such as the second service provider entry node 3312, implements automatic network configuration as described herein to identify an optimal exit node. For example, the second service provider entry node 3312 may identify the first service provider exit node 3330 as the optimal exit node, such as in response to receiving data identifying the first service provider exit node 3330 as the optimal exit node from one or more of service provider infrastructure control components (not expressly shown in FIG. 3.) An example of automatic network configuration as described herein is shown in FIG. 5.

A protocol data unit (PDU), such as a packet, or another signal or electronic communication message, may be sent, or transmitted, by the client device 3110 to the server device 3220, is received, obtained, or otherwise accessed, by the second service provider entry node 3312. The second service provider entry node 3312 forwards, or otherwise makes available, the protocol data unit to the first internal node 3320. The first internal node 3320 forwards, or otherwise makes available, the protocol data unit to the first exit node 3330. The first exit node 3330 sends, transmits, or otherwise makes available, the protocol data unit to the second server system entry node 3212. The protocol data unit is received, obtained, or otherwise accessed, by the second server system entry node 3212. The second server system entry node 3212 forwards, or otherwise makes available, the protocol data unit to the server device 3220.

The data transport pathway 3400 may be bidirectional. For example, a protocol data unit, such as a packet, or another signal or electronic communication message, sent, or transmitted, by the server device 3220 to the client device 3110, is sent, transmitted, or otherwise made available, by the server device 3220, to the second server system entry node 3212. The second server system entry node 3212 sends, transmits, or otherwise makes available, the protocol data unit to the first exit node 3330. The first exit node 3330 forwards, or otherwise makes available, the protocol data unit to the first internal node 3320. The first internal node 3320 forwards, or otherwise makes available, the protocol data unit to the second service provider entry node 3312. The second service provider entry node 3312 sends, transmits, or otherwise makes available, the protocol data unit to the client device 3110. The client device 3110 receives, obtains, or otherwise accesses the protocol data unit from the second service provider entry node 3312.

Figure 4:
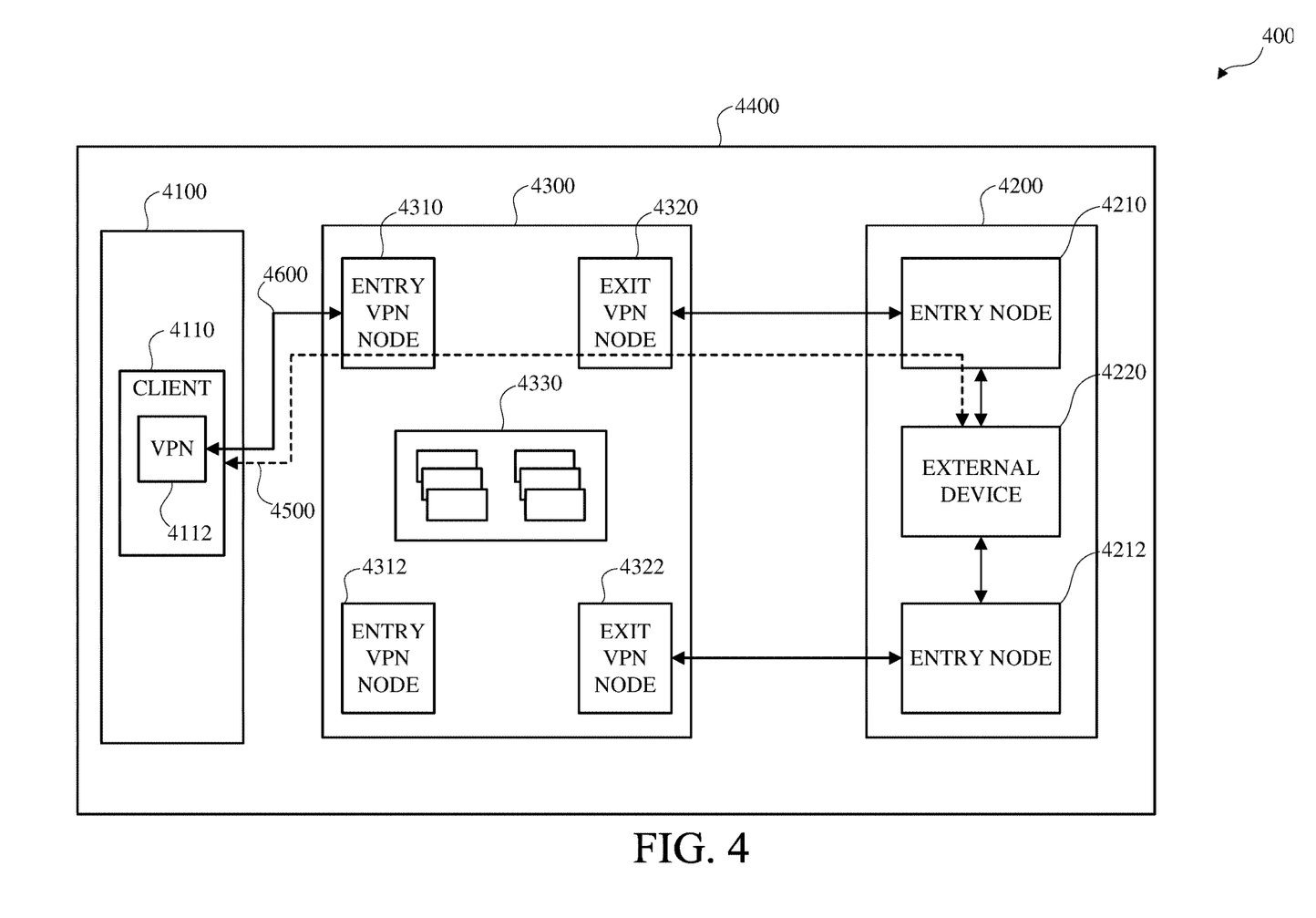
FIG. 4 is a diagram of another example of electronic communication using a service provider infrastructure system.

FIG. 4 is a diagram of another example of electronic communication using a service provider infrastructure system 4000. Electronic communication using a service provider infrastructure system 4000 includes a client system 4100 communicating with an external system 4200 using a service provider infrastructure system 4300 in a publicly shared, or accessible, network, or infrastructure, 4400, such as the network 2500 shown in FIG. 2, which may be the Internet. In the example shown in FIG. 4, the service provider infrastructure (SPI) system 4300 is a virtual private network service provider (VSP) system.

The client system 4100 includes a client device 4110, such as the computing device 1000 shown in FIG. 1 or one or more of the computing and communications device 2300, 2410, 2420, 2510, 2520, 2530 shown in FIG. 2. Although one client device 4110 is shown in FIG. 4, the client system 4100 may include multiple computing devices. The client device 4110 includes, such as implements or operates, a virtual private network client component 4112 (VPN), which may be a software component, a hardware component, or a combination of software and hardware components.

The external system 4200 includes a first external system entry node 4210, a second external system entry node 4212, and an external device 4220. Although two external system entry nodes 4210, 4212 are shown, the external system 4200 may include one or more external system entry nodes. Although one external device 4220 is shown, the external system 4200 may include multiple external devices. The external system entry nodes 4210, 4212 and the external device 4220 may be respective computing devices, such as the computing device 1000 shown in FIG. 1 or one or more of the computing and communications device 2300, 2410, 2420, 2510, 2520, 2530 shown in FIG. 2. Although shown separately, in some implementations, the external system entry nodes 4210, 4212 may be respective external devices. The external system entry nodes 4210, 4212 may, respectively, communicate with the external device 3220, as indicated by the solid bidirectional lines between the external system entry nodes 3210, 3212 and the external device 3220.

As shown in FIG. 4, the service provider infrastructure system 4300 implements a secure private networking environment, the virtual private network, within, or operating using, the publicly shared network 4400 by encapsulating, encrypting, or both, data communicated between the client device 4110 and the service provider infrastructure system 4300. To implement the virtual private network, the service provider infrastructure system 4300 may use a tunnelling protocol, a cryptography protocol, or both. The tunnelling protocol may describe the encapsulation of data, the extraction of data previously encapsulated, or both. The cryptography protocol, such as the symmetric Advanced Encryption Standard (AES) cipher or the asymmetric Rivest-Shamir-Adleman (RSA) protocol, may describe the encryption of data, the description of previously encrypted data, or both. To implement the virtual private network, the service provider infrastructure system 4300 may implement user, or client, authentication, wherein authentication credentials are verified to confirm the authenticity, identity, or both, of the user, or client. The service provider infrastructure system 4300 may implement a virtual private network protocol, such as OpenVPN, Secure Socket Tunneling Protocol (SSTP), Point-to-Point Tunneling Protocol (PPTP), Layer 2 Tunneling Protocol (L2TP)/IP Security, Secure Sockets Layer (SSL)/Transport Layer Security (TLS), Wireguard, Internet key exchange version two (IKEv2), or SoftEther.

The service provider infrastructure system 4300 includes a first service provider entry node 4310 (entry VPN node), a second service provider entry node 4312 (entry VPN node), a first exit node 4320 (exit VPN node), a second exit node 4322 (exit VPN node), and service provider infrastructure control components 4330. Although not shown in FIG. 4, the service provider infrastructure system 4300 may include other components, such as one or more internal nodes, which may be similar to the internal nodes 3320, 3322, 3324 shown in FIG. 3, except as is described herein or as is otherwise clear from context.

The service provider entry nodes 4310, 4312 may be respective virtual private network servers, which may be respective computing devices, such as the computing device 1000 shown in FIG. 1 or one or more of the computing and communications device 2300, 2410, 2420, 2510, 2520, 2530 shown in FIG. 2. Although two service provider entry nodes 4310, 4312 are shown, the service provider infrastructure system 4300 may include one or more service provider entry nodes. In some implementations, one or more of the service provider entry nodes 4310, 4312 may, respectively, be implemented as virtual servers.

The exit nodes 4320, 4322 may be respective virtual private network servers, which may be respective computing devices, such as the computing device 1000 shown in FIG. 1 or one or more of the computing and communications device 2300, 2410, 2420, 2510, 2520, 2530 shown in FIG. 2. Although two exit nodes 4320, 4322 are shown, the service provider infrastructure system 4300 may include one or more exit nodes. In some implementations, one or more of the exit nodes 4320, 4322 may, respectively, be implemented as virtual servers.

Although shown separately, one or more of the elements of the service provider infrastructure system 4300 shown in FIG. 4 may be combined. For example, a respective service provider entry node 4310, 4312 and a respective exit node 4320, 4322 may be implemented as a combined unit.

The service provider infrastructure control components 4330 may include an application programming interface (API) unit, a user database, a processing unit, a server database, a testing unit, or another component, or components, for controlling a service provider infrastructure, such as the virtual private network service provider system 4300 as shown. The service provider infrastructure control components 4330 may be implemented by one or more computing devices, such as the computing device 1000 shown in FIG. 1 or one or more of the computing and communications device 2300, 2410, 2420, 2510, 2520, 2530 shown in FIG. 2.

Although not expressly shown in FIG. 4, the elements of the service provider infrastructure control components 4330 may communicate with the other elements of the service provider infrastructure control components 4330. For example, the application programming interface unit may communicate with the user database and the processing unit. In another example, the processing unit may communicate with the application programming interface unit and the server database.

Although not expressly shown in FIG. 4 for clarity, the elements of the service provider infrastructure system 4300 may communicate with the other elements of the service provider infrastructure system 4300. For example, the service provider infrastructure control components 4330, or respective elements thereof, may communicate with the service provider entry nodes 4310, 4312, the exit nodes 4320, 4322, or both. In another example, one or more of the entry nodes 4310, 4312 may communicate with one or more of the exit nodes 4320, 4322. In some implementations, one or more of the elements of the service provider infrastructure system 4300 may securely communicate via a publicly shared, or accessible, network, or infrastructure, such as the publicly shared, or accessible, network, or infrastructure, 4400, which may include using a virtual private network (not expressly shown).

Multiple data transport pathways between the client device 4110 and the external device 4220 may be identified and used. A respective data transport pathway between the client device 4110 and the external device 4220 includes a data transport pathway between the client device 4110 and the service provider infrastructure system 4300, such as a data transport pathway between the client device 4110 and the first service provider entry node 4310, or a data transport pathway between the client device 4110 and the second service provider entry node 4312.

A respective data transport pathway between the client device 4110 and the external device 4220 includes a data transport pathway between the service provider infrastructure system 4300 and the external system 4200, which includes an exit node 4320, 4322 of the service provider infrastructure system 4300 and an external system entry node 4210, 4212 of the external system 4200, such as a data transport pathway between the service provider infrastructure system 4300 and the external system 4200 that includes the first exit node 4320 and the first external system entry node 4210, a data transport pathway between the service provider infrastructure system 4300 and the external system 4200 that includes the first exit node 4320 and the second external system entry node 4212, a data transport pathway between the service provider infrastructure system 4300 and the external system 4200 that includes the second exit node 4322 and the first external system entry node 4210 (not expressly shown), or a data transport pathway between the service provider infrastructure system 4300 and the external system 4200 that includes the second exit node 4322 and the second external system entry node 4212.

For example, a data transport pathway 4500 between the client device 4110 and the external device 4220 is shown using a broken directional line for clarity. Other data transport pathways may be used. A portion of the data transport pathway 4500 includes a secure virtual private network tunnel 4600 between the virtual private network client component 4112 of the client device 4110 and the first service provider entry node 4310 of the service provider infrastructure system 4300. Other data transport pathways, including other secure virtual private network tunnels, (not expressly shown), such as a data transport pathway that includes a secure virtual private network tunnel between the virtual private network client component 4112 of the client device 4110 and the second service provider entry node 4312 of the service provider infrastructure system 4300, may be used.

As shown in FIG. 4, data may be sent, or transmitted, by the client device 4110, to the external device 4220, via the data transport pathway 4500 in a current communication session. For example, to send the data to the external device 4220, the client device 4110, or an application, process, or thread operating therein, generates a protocol data unit, such as a packet, or another signal or electronic communication message, including the data as payload data, and including, such as in a header, a footer, or both, addressing data, control data, or both. The addressing data may include a source address identifying the client device 4110, such as an IP address of the client device 4110, as a source of the protocol data unit, and delivery data identifying an address of the target recipient for the protocol data unit as the external device 4220, such as an IP address of the external device 4220. The protocol data unit is encrypted, encapsulated, or both, by the virtual private network client component 4112, to obtain a virtual private network protocol data unit, such as in accordance with a virtual private network protocol implemented by the private network client component 4112 and the service provider infrastructure system 4300, or a component thereof, such as the first service provider entry node 4310.

The client device 4110, or the virtual private network client component 4112 of the client device 4110, sends, transmits, or otherwise makes available, the virtual private network protocol data unit to the first service provider entry node 4310 using the previously established secure virtual private network tunnel 4600. The first service provider entry node 4310 extracts the protocol data unit from the virtual private network protocol data unit, such as in accordance with the virtual private network protocol implemented by the private network client component 4112 and the first service provider entry node 4310, which may include decrypting the protocol data unit.

The service provider infrastructure system 4300, or a component thereof, such as the first service provider entry node 4310, implements automatic network configuration as described herein to identify an optimal exit node for transporting the protocol data unit. For example, the first service provider entry node 4310 identifies the first service provider exit node 4320 as the optimal exit node for transporting the protocol data unit, such as in response to receiving data identifying the first service provider exit node 4320 as the optimal exit node for transporting the protocol data unit from one or more of the service provider infrastructure control components 4330, such as from the application programming interface unit. An example of the automatic network configuration described herein is shown in FIG. 5.

The first service provider entry node 4310 securely sends, transmits, or otherwise makes available, the virtual private network protocol data unit to the first service provider exit node 4320. The first service provider exit node 4320 extracts the payload data and the header data from the protocol data unit and generates a second protocol data unit, or another signal or electronic communication message, including the payload data, and including data, such as header data, identifying the service provider infrastructure system 4300, such as an IP address of the first service provider exit node 4320, the delivery data identifying the external device 4220, and delivery data identifying the first external system entry node 4210. The first service provider exit node 4320 sends, transmits, or otherwise makes available, the second protocol data unit to the external device 4220 via the first external system entry node 4210. In some implementations, the first service provider entry node 4310, or another element of the service provider infrastructure system 4300, may generate and send the second protocol data unit to the first service provider exit node 4320. The external device 4220 may identify, such as in accordance with addressing data from the protocol data unit, the address of the service provider infrastructure system 4300, or the first service provider exit node 4320, as the source address.

The data transport pathway 4500 may be bidirectional. Data may be received, obtained, or otherwise accessed, by the client device 4110 from the external device 4220 in the current communication session, via the data transport pathway 4500, or via another data transport pathway. For example, to send the data, the external device 4220, or an application, process, or thread operating therein, generates a protocol data unit, such as a packet, or another signal or electronic communication message, including the data as payload data, and including addressing data, control data, or both, such as in header data, footer data, or both, a source address identifying the external device 4220, such as an IP address of the external device 4220, and including delivery data identifying a target recipient, or destination, address for the protocol data unit as the address of the service provider infrastructure system 4300, such as the IP address of the first service provider exit node 4320. The external device 4220 sends, transmits, or otherwise makes available, the protocol data unit to the first service provider exit node 4320 via the first external system entry node 4210.

The first service provider exit node 4320 extracts the payload data and the addressing and control data from the protocol data unit and generates a second protocol data unit, or another signal or electronic communication message, including the payload data, and including addressing data, control data, or both, such as in header data, footer data, or both, identifying the address of the external device 4220, such as the IP address of the external device 4220, as the source of the protocol data unit, and including delivery data identifying the address of the client device 4210.

The first service provider exit node 4320 securely sends, transmits, or otherwise makes available, the second protocol data unit to the first service provider entry node 4310. The first service provider entry node 4310 encrypts, encapsulates, or both, the second protocol data unit, such as in accordance with the virtual private network protocol implemented by the private network client component 4112 and the first service provider entry node 4310, to obtain a virtual private network protocol data unit. The first service provider entry node 4310 sends, transmits, or otherwise makes available, the virtual private network protocol data unit to the client device 4110, or the virtual private network client component 4112 of the client device 4110, using the previously established secure virtual private network tunnel 4600.

The virtual private network client component 4112 of the client device 4110 extracts the protocol data unit from the virtual private network protocol data unit, such as in accordance with the virtual private network protocol implemented by the private network client component 4112 and the first service provider entry node 4310, which may include decrypting the protocol data unit. The virtual private network client component 4112 of the client device 4110 sends, or otherwise makes available, the payload data from the protocol data unit to the client device 4110, or an application, process, or thread operating thereon and associated with the current communication session.

FIG. 5 is a flowchart of an example of automatic network configuration 5000.

Automatic network configuration 5000 may be implemented by one or more computing devices, such as one or more of the computing device 1000 shown in FIG. 1 or one or more of the computing and communications device 2300, 2410, 2420, 2510, 2520, 2530 shown in FIG. 2, or by a system, such as the network 2500 shown in FIG. 2, including one or more computing devices.

A service provider infrastructure system, such as the service provider infrastructure system 4300 shown in FIG. 4, or a component, or components, thereof, such as a service provider entry node, such as the first service provider entry node 4310 shown in FIG. 4, alone or in combination with one or more of service provider infrastructure control components, such as the service provider infrastructure control components 4330 shown in FIG. 4, such as an application programming interface unit, implements automatic network configuration 5000.

Automatic network configuration 5000 includes the service provider infrastructure system, or a component thereof, obtaining data transport pathway ranking data at 5100 for available candidate data transport pathways, and allocating an optimal, in accordance with the automatic network configuration 5000 described herein, data transport pathway to a respective communication or communication session at 5200. Automatic network configuration 5000, or a portion thereof, may be performed with respect to a communication, or a communication session, between a client node, such as the client device 4110 shown in FIG. 4, and a destination note, such as the external device 4220 shown in FIG. 4.

Obtaining data transport pathway ranking data at 5100 for available candidate data transport pathways includes the service provider infrastructure system, or a component thereof, identifying available candidate data transport pathways. Identifying the available candidate data transport pathways at 5100 includes identifying available candidate exit nodes at 5110, such as the first exit node 4320 (exit VPN node) and the second exit node 4322 (exit VPN node) shown in FIG. 4.

Identifying the available candidate exit nodes includes the service provider infrastructure system, or a component thereof, ranking, scoring, or sorting, the available candidate exit nodes at 5120, wherein the ranking, scoring, or sorting, indicates a determined likelihood or probability that a respective available candidate exit node, or the available candidate exit nodes in a respective available candidate exit node pool, will efficiently and accurately transport the communication, or communications in the communication session, such as in support of a service provided, or hosted, by the external device. The ranking may be based on one or more identified attributes for the respective available candidate exit nodes, one or more test results for the respective available candidate exit nodes, or a combination thereof.

The attributes for a respective available candidate exit node may be identified at 5112 by the service provider infrastructure system, or a component, or components thereof. The identified attributes can include a geographical location of a respective available candidate exit node, an internet protocol type supported, or implemented, by the respective available candidate exit node, an internet service provider of the respective available candidate exit node, or another identifiable static characteristic of the respective available candidate exit node, identifiable by the service provider infrastructure system, or a component thereof.

The test results for a respective available candidate exit node may be obtained by the service provider infrastructure system, or a component thereof, such as by implementing or performing one or more tests at 5114. For example, the service provider infrastructure system, or a component thereof, may determine, or test, the current, average, or both, speed, latency, or both, for a respective available candidate exit node. The service provider infrastructure system, or a component thereof, may determine, or test, the load, such as traffic per day, for a respective available candidate exit node. The service provider infrastructure system, or a component thereof, may determine, or test, the session runtime data for one or more sessions operating using the respective available candidate exit node. Other dynamic operating state tests may be performed. In some implementations, the test results may indicate bandwidth, latency, or other communication parameters for a respective data transport pathway, or for a component thereof, such as a respective available candidate exit node. In some implementations, the test results may include one or more hardware metrics, such as processing unit temperature, for the respective available candidate exit node.

The determined test results may be obtained by performing, such as by the service provider infrastructure system, or a component thereof, one or more synthetic tests. For example, to perform, or implement, a synthetic test, the service provider infrastructure system, or a component thereof, may send, or transmit, a request to access a resource, such as target content or a target service, of, such as hosted or provided by, the external device, or external system, such as a login service, a streaming service, a payment service, or the like, via a respective available candidate exit node. In some implementations, the respective content or service may be accessible, or available, via the respective available candidate exit node and the rank, score, or sort order of the respective available candidate exit node may be increased. In some implementations, the respective content or service may be inaccessible, or unavailable, via the respective available candidate exit node and the rank, score, or sort order of the respective available candidate exit node may be decreased. In an example, a synthetic test may include sending a testing IP packet and measuring the round-trip time (RTT) of the packet, such as using PING, such as to determine network connection latency with respect to a corresponding external device, or external system. In some implementations, non-synthetic tests, such as load tests, may be omitted, or corresponding results may be given little, or no, weight, and the synthetic test results may be used.

In some implementations, one or more target external servers, external systems, or services, provided or hosted by an external server or external system, may be identified as priority targets. Servers, or entry nodes, for the respective priority targets may be identified. The identified servers of the priority targets may be grouped, such as geographically. The service provider infrastructure system, or a component thereof, may determine, or test, the current availability, or connection status, for the respective servers, or for the services hosted thereon, or accessible thereby, which may include sending a respective request to access the respective server or service via respective exit nodes of the service provider infrastructure system. The service provider infrastructure system, or a component thereof, may determine, or measure, data received in response to the requests (response data measurements). The service provider infrastructure system, or a component thereof, may pool, or logically group, the exit nodes in accordance with metrics, which may include the response data measurements. Other metrics or combinations of metrics, such as service type, such as gaming service type, music service type, or shopping service type, may be used in addition or in the alternative.

In some implementations, performing the tests, such as the synthetic tests, may include identifying an exit node pool as a logical entity, and sending, transmitting, or otherwise making available, one or more, such as a defined cardinality, of test requests, by the respective exit nodes of a respective exit node pool. The requests may be sent in one or more temporal slots, such as at various times per day, various days per week, or various days per month. In some implementations, the requests may be sent in bursts of multiple temporally concurrent or temporally adjacent requests. In some implementations, the requests may be sent in repeated sequences. In some implementations, the requests may be sent in bursts and in repeated sequences.

In some implementations, one or more exit nodes may be pooled based on an association between the respective exit nodes, such as based on inclusion of the exit nodes in a data center, based on an association between the exit nodes and a data service provider, or based on a combination of data service provider and physical data center location. In some implementations, one or more exit nodes may be pooled based on a respective physical, data delivery, distance of the respective exit node from a proximal international networking hub.

In some implementations, the exit nodes may be pooled based on one or more static pooling criteria, such as processor speed, processor core count, system memory size, maximum throughput, physical location, data service provider, or a combination thereof, and the pooling may be revised based on dynamic metrics or criteria, such as metrics determined by the testing described herein. For example, the dynamic metrics or criteria determined for the exit nodes in a pool may be aggregated and applied to the pool, as, for example, a penalty value, and the pooling may be modified or revised, such as by moving one or more exit nodes, such as up to a defined number or percentage, such as ten percent, of the exit nodes in a respective pool, to another pool to balance the performance of the pools.

Attributes, test results, or both, may be determined, obtained, generated, or identified, for respective available candidate exit nodes from the available candidate exit nodes, as indicated by the broken directional line at 5116.

The available candidate exit nodes may be sorted, scored, or ranked in accordance with the identified attributes, the determined test results, or a combination thereof at 5120. In some implementations, the service provider infrastructure system, or a component thereof, may score, rank, or sort the respective available candidate exit nodes at 5120 in accordance with the identified attributes obtained at 5112, the determined test results generated at 5114, or a combination thereof.

For example, the available candidate exit nodes may be scored, ranked, or sorted in accordance with current utilization data obtained, such as by the service provider infrastructure system, or a component thereof, for the respective available candidate exit nodes, such that an available candidate exit node having the lowest current utilization, or occupancy, may be the highest ranked available candidate exit node and an available candidate exit node having the highest current utilization, such as the highest number, or cardinality, of current sessions, clients, or users, associated therewith.

In some implementations, identifying the available candidate exit nodes, may include grouping, or pooling, the available candidate exit nodes into one or more available candidate exit node pools, such as a priority, or primary, pool, a secondary pool, and a tertiary pool at 5130, which may include identifying a subset of the data transport pathways as a priority pool in accordance with the ranking data. In some implementations, the service provider infrastructure system, or a component thereof, may score, rank, or sort the respective available candidate exit nodes, and may include the respective available candidate exit nodes in the respective available candidate exit node pools in accordance with the identified attributes, the determined test results, or a combination thereof. In some implementations, the pooling at 5130 may be omitted as indicated by the broken line border at 5130.

The service provider infrastructure system, or the component, or components thereof, may maintain, such as update, the scoring, ranking, sorting, or pooling data continually, which may include periodically obtaining respective testing data and updating the scoring, ranking, sorting, or pooling data in response thereto. In some implementations, the scoring, ranking, sorting, or pooling data may be updated in response to the service provider infrastructure system, or the component, or components thereof, receiving, obtaining, or otherwise accessing event data, such as event data indicating the availability of a previously unavailable candidate exit node.

Allocating an optimal, in accordance with the automatic network configuration 5000 described herein, data transport pathway to a respective communication or communication session at 5200 may include allocating, such as by the service provider infrastructure system, or the component, or components thereof, a data transport pathway from the available candidate data transport pathways, including a respective available candidate exit node, to the communication or communication session between the virtual private network service provider infrastructure system and the external system on behalf of the client system. For example, the respective available candidate exit nodes may be ranked, scored, or sorted, and the highest-ranking available candidate exit node may be allocated to the communication or communication session between the virtual private network service provider infrastructure system and the external system on behalf of the client system. In another example, the available candidate pools may be identified, and an available candidate exit node from the highest-ranking available candidate exit node pool, such as the primary, or priority pool, may be allocated to the communication or communication session between the virtual private network service provider infrastructure system and the external system on behalf of the client system.

Unless expressly stated, or otherwise clear from context, the terminology "computer," and variations or wordforms thereof, such as "computing device," "computing machine," "computing and communications device," and "computing unit," indicates a "computing device," such as the computing device 1000 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts, shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine." "identify." and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of automatic network configuration, the method comprising:
   receiving, by a virtual private network service provider infrastructure system, from a client system, via a virtual private network tunnel, a protocol data unit, wherein the protocol data unit is addressed to an external system, wherein the protocol data unit is associated with a communication session between the virtual private network service provider infrastructure system and the external system on behalf of the client system;
   in response to receiving the protocol data unit, obtaining, by the virtual private network service provider infrastructure system, ranking data for data transport pathways between the virtual private network service provider infrastructure system and the external system, wherein a respective data transport pathway from the data transport pathways includes a respective exit node in the virtual private network service provider infrastructure system in communication with a respective entry node in the external system, wherein obtaining the ranking data includes obtaining at least a portion of the ranking data by testing a service provided by the external system via the entry node; and
   allocating, by the virtual private network service provider infrastructure system, a data transport pathway from the data transport pathways to the communication session, wherein the data transport pathway is a highest-ranking data transport pathway in the ranking data; and
   sending the protocol data unit to the external system via the data transport pathway.

2. The method of claim 1, wherein:
   obtaining the ranking data includes identifying a subset of the data transport pathways as a priority pool in accordance with the ranking data; and
   allocating the data transport pathway includes allocating the priority pool to the communication session.

3. The method of claim 1, wherein obtaining the ranking data includes:
   identifying one or more available candidate exit nodes in the virtual private network service provider infrastructure system, wherein the available candidate exit nodes include the respective exit node.

4. The method of claim 1, wherein obtaining the ranking data includes:
   identifying attribute data for the respective exit node.

5. The method of claim 1, wherein testing the service provided by the external system via the entry node includes:
   generating test results data for the respective exit node.

6. The method of claim 5, wherein generating the test results data for the respective exit node includes:
   sending, to the external system, via the respective exit node in the virtual private network service provider infrastructure system and the respective entry node in the external system, a request to access a resource of the external system; and
   obtaining data indicating whether the resource is available via the respective exit node in the virtual private network service provider infrastructure system and the respective entry node in the external system.

7. The method of claim 6, wherein:
   the resource of the external system is associated with the service provided by the external system.

8. An apparatus of a virtual private network service provider infrastructure system comprising:
   a non-transitory computer-readable storage medium; and
   a processor that executes instructions stored in the non-transitory computer-readable storage medium to:
      receive, from a client system, via a virtual private network tunnel, a protocol data unit, wherein the protocol data unit is addressed to an external system, wherein the protocol data unit is associated with a communication session between the virtual private network service provider infrastructure system and the external system on behalf of the client system;
      in response to receiving the protocol data unit, obtain ranking data for data transport pathways between the virtual private network service provider infrastructure system and the external system, wherein a respective data transport pathway from the data transport pathways includes a respective exit node in the virtual private network service provider infrastructure system in communication with a respective entry node in the external system, wherein, to obtain at least a portion of the ranking data, the processor executes the instructions to test a service provided by the external system via the entry node;

allocate a data transport pathway from the data transport pathways to the communication session, wherein the data transport pathway is a highest-ranking data transport pathway in the ranking data; and send the protocol data unit to the external system via the data transport pathway.

9. The apparatus of claim 8, wherein:

to obtain the ranking data the processor executes the instructions to identify a subset of the data transport pathways as a priority pool in accordance with the ranking data; and to allocate the data transport pathway the processor executes the instructions to allocate the priority pool to the communication session.

10. The apparatus of claim 8, wherein to obtain the ranking data the processor executes the instructions to:

identify one or more available candidate exit nodes in the virtual private network service provider infrastructure system, wherein the available candidate exit nodes include the respective exit node.

11. The apparatus of claim 8, wherein to obtain the ranking data the processor executes the instructions to:

identify attribute data for the respective exit node.

12. The apparatus of claim 8, wherein to test the service provided by the external system via the entry node the processor executes the instructions to:

generate test results data for the respective exit node.

13. The apparatus of claim 12, wherein to generate the test results data for the respective exit node the processor executes the instructions to:

send, to the external system, via the respective exit node in the virtual private network service provider infrastructure system and the respective entry node in the external system, a request to access a resource of the external system; and obtain data indicating whether the resource is available via the respective exit node in the virtual private network service provider infrastructure system and the respective entry node in the external system.

14. A non-transitory computer-readable storage medium, comprising executable instructions that, when executed by a processor, perform:

receiving, by a virtual private network service provider infrastructure system, from a client system, via a virtual private network tunnel, a protocol data unit, wherein the protocol data unit is addressed to an external system, wherein the protocol data unit is associated with a communication session between the virtual private network service provider infrastructure system and the external system on behalf of the client system;

in response to receiving the protocol data unit, obtaining, by the virtual private network service provider infrastructure system, ranking data for data transport pathways between the virtual private network service provider infrastructure system and the external system, wherein a respective data transport pathway from the data transport pathways includes a respective exit node in the virtual private network service provider infrastructure system in communication with a respective entry node in the external system, wherein obtaining the ranking data includes obtaining at least a portion of the ranking data by testing a service provided by the external system via the entry node; and allocating, by the virtual private network service provider infrastructure system, a data transport pathway from the data transport pathways to the communication session, wherein the data transport pathway is a highest-ranking data transport pathway in the ranking data; and sending the protocol data unit to the external system via the data transport pathway.

15. The non-transitory computer-readable storage medium of claim 14, wherein:

obtaining the ranking data includes identifying a subset of the data transport pathways as a priority pool in accordance with the ranking data; and allocating the data transport pathway includes allocating the priority pool to the communication session.

16. The non-transitory computer-readable storage medium of claim 14, wherein obtaining the ranking data includes:

identifying one or more available candidate exit nodes in the virtual private network service provider infrastructure system, wherein the available candidate exit nodes include the respective exit node.

17. The non-transitory computer-readable storage medium of claim 14, wherein obtaining the ranking data includes:

identifying attribute data for the respective exit node.

18. The non-transitory computer-readable storage medium of claim 14, wherein testing the service provided by the external system via the entry node includes:

generating test results data for the respective exit node.

19. The non-transitory computer-readable storage medium of claim 18, wherein generating the test results data for the respective exit node includes:

sending, to the external system, via the respective exit node in the virtual private network service provider infrastructure system and the respective entry node in the external system, a request to access a resource of the external system; and obtaining data indicating whether the resource is available via the respective exit node in the virtual private network service provider infrastructure system and the respective entry node in the external system.

20. The non-transitory computer-readable storage medium of claim 19, wherein:

the resource of the external system is associated with the service provided by the external system.

* * * * *